(12) United States Patent
Tretow et al.

(10) Patent No.: US 10,071,815 B2
(45) Date of Patent: Sep. 11, 2018

(54) THRUST RECOVERY OUTFLOW VALVES FOR USE WITH AIRCRAFT

(71) Applicant: The Boeing Company, Chicago, IL (US)

(72) Inventors: Paul R. Tretow, Mukilteo, WA (US); Robert H. Willie, Bothell, WA (US); Nicholas R. Ferraiolo, Bothell, WA (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 15/082,582

(22) Filed: Mar. 28, 2016

(65) Prior Publication Data

US 2017/0275012 A1  Sep. 28, 2017

(51) Int. Cl.
*B64D 33/04* (2006.01)
*B64D 13/04* (2006.01)
*B64D 13/02* (2006.01)

(52) U.S. Cl.
CPC ............ *B64D 33/04* (2013.01); *B64D 13/02* (2013.01); *B64D 13/04* (2013.01)

(58) Field of Classification Search
CPC ......... B64D 33/04; B64D 13/04; B64D 13/02
See application file for complete search history.

(56) References Cited

U.S. PATENT DOCUMENTS 3,426,984 A * 2/1969 Emmons ................ B64D 13/02
244/117 R
3,436,039 A 4/1969 Seger et al.
8,376,818 B2 2/2013 Horner
8,632,381 B2 1/2014 Horner et al.
8,840,451 B2 9/2014 Royalty et al.
(Continued)

FOREIGN PATENT DOCUMENTS

EP      2428446         3/2012
WO      9844300         10/1998
WO      WO-9844300 A1 * 10/1998 ............ B64D 13/02

OTHER PUBLICATIONS

European Patent Office, "Extended Search Report," issued in connection with European Patent Application No. 17151054.8, dated Jun. 30, 2017, 8 pages.

*Primary Examiner* — Justin M Benedik
(74) *Attorney, Agent, or Firm* — Hanley, Flight & Zimmerman, LLC

(57) ABSTRACT

Thrust recovery outflow valves for aircraft are disclosed. An example thrust recovery outflow valve includes a flow control member having a first aerodynamic surface and a second aerodynamic surface to define at least a portion of a fluid flow passageway between an inlet and an outlet of the thrust recovery outflow valve. A first portion of the first aerodynamic surface and a first portion of the second aerodynamic surface provides a converging profile between the inlet and a throat of the fluid flow passageway. A second portion of the first aerodynamic surface and a second portion of the second aerodynamic surface provides a diverging profile between the throat and the outlet of the fluid flow passageway. The fluid flow passageway is positioned at a small angle relative to an outer surface of an aircraft to enable fluid exiting the fluid flow passageway to provide a thrust recovery vector oriented substantially parallel to the outer surface of the aircraft and opposite a direction of drag.

20 Claims, 4 Drawing Sheets

(56) References Cited

U.S. PATENT DOCUMENTS

| | | | |
|---|---|---|---|
| 2004/0238046 A1* | 12/2004 | Hoffman | B60H 1/248 137/601.08 |
| 2010/0291852 A1 | 11/2010 | Steinert et al. | |
| 2011/0165828 A1* | 7/2011 | Horner | B64D 13/02 454/74 |
| 2011/0177770 A1* | 7/2011 | Tanner | B64D 13/04 454/74 |
| 2013/0059517 A1 | 3/2013 | Homer et al. | |
| 2013/0086791 A1 | 4/2013 | Maunder | |
| 2013/0186497 A1* | 7/2013 | Royalty | B64D 13/02 137/899.2 |

* cited by examiner

THRUST RECOVERY OUTFLOW VALVES FOR USE WITH AIRCRAFT

FIELD OF THE DISCLOSURE

This patent relates generally to control valves and, more particularly, to thrust recovery outflow valves for use with aircraft.

BACKGROUND

To provide passenger comfort during flight, commercial aircraft employ cabin pressurization control systems to maintain pressure inside a cabin of an aircraft fuselage within a desired range. In particular, the cabin pressurization control system regulates air pressure within the cabin to a desired pressure value by controlling cabin air flow through one or more outflow valves positioned in an opening or openings defined in a body of the aircraft. In some aircraft, the outflow valves may be designed to recover some of the thrust lost or drag incurred when air is provided into the cabin from engine bleed flow or from the aircraft external flow.

SUMMARY

In another example, a thrust recovery outflow valve includes a flow control member having a first aerodynamic surface and a second aerodynamic surface to define at least a portion of a fluid flow passageway between an inlet and an outlet of the thrust recovery outflow valve. A first portion of the first aerodynamic surface and a first portion of the second aerodynamic surface provides a converging profile between the inlet and a throat of the fluid flow passageway. A second portion of the first aerodynamic surface and a second portion of the second aerodynamic surface provides a diverging profile between the throat and the outlet of the fluid flow passageway. The fluid flow passageway is positioned at a small angle relative to an outer surface of an aircraft to enable fluid exiting the fluid flow passageway to provide a thrust recovery vector oriented substantially parallel to the outer surface of the aircraft and opposite a direction of drag.

An example thrust recovery outflow valve includes a first gate having a first aerodynamic surface, and a second gate having a second aerodynamic surface. The first gate to move relative to the second gate between an open position to allow fluid flow to atmosphere and a closed position to prevent fluid flow to atmosphere. The first aerodynamic surface of the first gate is spaced from the second aerodynamic surface of the second gate to define a fluid flow passageway having a convergent-divergent shape or profile when the thrust recovery outflow valve is in the open position. The first aerodynamic surface has a first portion and a second position. The second portion positioned between the first portion and an outlet of the thrust recovery outflow valve. The first portion including a curved profile and an upwardly extending surface extending from an end of the curved profile. The second portion has a tapered profile extending between a first end adjacent the first portion and a second end adjacent the outlet.

Another example thrust recovery outflow valve includes an actuator coupled to a frame, a first gate rotationally coupled to the frame, and a second gate rotationally coupled to the frame. A surface of the first gate is to be spaced from a surface of the second gate to define a fluid flow passageway between an inlet and an outlet of the thrust recovery outflow valve. The first gate is to move relative to the second gate between a closed position to prevent fluid flow through the fluid flow passageway and an open position to allow fluid flow through the fluid flow passageway. A controller is communicatively coupled to the actuator. The controller to determine a position of the first gate relative to the second gate that provides a throat area of the fluid flow passageway to accommodate a predetermined mass flow rate of cabin air. The position of the first gate and the second gate results in an outlet area to throat area ratio through at least a portion of the fluid flow passageway that enables cabin air exiting the outlet of the fluid flow passageway to be substantially similar to atmospheric pressure at an altitude at of the aircraft.

Figure 1:
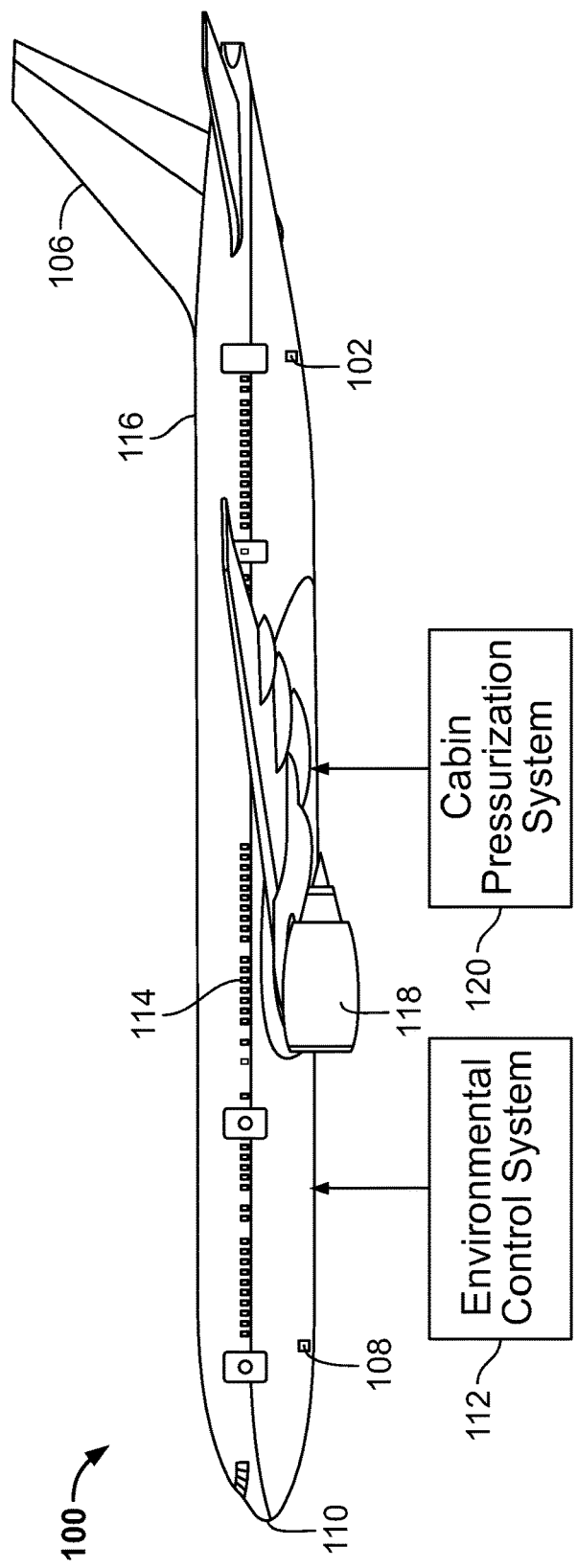
FIG. 1 depicts an example aircraft having an example thrust recovery outflow valve constructed in accordance with the teachings disclosed herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in direct contact with another part means that there is no intermediate part between the two parts.

DETAILED DESCRIPTION

Commercial aircraft employ a cabin pressurization control system to control cabin air pressure and/or ventilate the cabin during flight and on the ground. For example, during the flight, variations in aircraft altitude cause rapid changes in ambient pressure. The cabin pressure control system regulates cabin air pressure and/or makes gradual changes in the cabin pressure during, for example, cruise, ascent and descent. For example, during cruise, while an external ambient pressure may be equivalent to an altitude of approximately 36,000 feet, the cabin pressure may be maintained at a pressure corresponding to an altitude of approximately 8,000 feet (e.g., a cabin altitude). A cabin pressurization control system typically employs one or more outflow valves to regulate the pressure inside the cabin by controlling a flow of air through the outflow valve. For example, a cabin pressurization controller of the cabin pressurization control system modulates the outflow valve, in conjunction with a cabin air inflow source (e.g., via an environmental control system), to maintain a desired cabin pressure.

In some instances, cabin air flowing through the outflow valve generates noise or an acoustic tone that can be irritating or unpleasant to passengers and/or crew. To suppress noise generation when exhausting cabin air, some outflow valves employ a noise suppression apparatus (e.g., vortex generators). However, noise suppressors disturb an outgoing airflow pattern and/or change a momentum of cabin air flowing through the outflow valve. Specifically, by altering the flow pattern, potential energy stored in the cabin air discharging from the outflow valve may be lost and, as a result, cannot generate a significant amount of thrust. Thus, noise suppressors may significantly reduce thrust recovery that may otherwise be generated from the cabin air discharging from the outflow valve.

The example thrust recovery outflow valves disclosed herein significantly increase (e.g., maximize) thrust recovery of exhausted cabin air, thereby reducing drag and increasing aircraft efficiency. For example, a measure of efficiency at which thrust is produced by an example thrust recovery outflow valve disclosed herein may be between approximately 83% and 90% when an aircraft implemented with the example thrust recovery outflow valve is cruising at a speed of Mach 0.84 at an altitude of approximately 37,000 feet, at a cabin pressure of 11.78 psi (e.g., 6,000 foot cabin altitude) and a cabin temperature of 72° F., and generates a mass flow rate through the thrust recovery outflow valve between approximately 2.0 (pounds/second) and 8.0 (pounds/second). In contrast, a measure of efficiency at which thrust is provided by known outflow valves under the same conditions may be between approximately 66% and 73%. Therefore, the example thrust recovery outflow valves significantly increase thrust recovery efficiency (e.g., by approximately 10% in some instances) compared to conventional outflow valves.

To increase thrust recovery efficiency, an outflow valve (e.g., an outlet opening or throat) may be positioned or oriented relative to an outer surface (e.g., a skin) of the fuselage and/or a body axis such that a thrust vector (e.g., a force vector) of the cabin air discharging from the outflow valve is substantially aligned with or substantially parallel relative to an outer surface or a body axis of an aircraft and/or a direction of flight (e.g., more parallel to an outer mold line or a body axis of the aircraft than perpendicular to the outer mold line). In some examples, the outflow valve thrust vector disclosed herein may be positioned with a substantially parallel orientation or may be substantially aligned relative to a skin (e.g., an outer surface or outer mold line) of a fuselage, a body axis of the aircraft and/or a direction of flight. As disclosed herein, substantially parallel or substantially aligned means positioning the outflow valve (e.g., a throat or opening orientation) and/or causing a thrust recovery vector exiting the valve to be at an angle with respect to a body axis of the aircraft, a skin (e.g., an outer surface or outer mold line) of the fuselage, and/or a direction of flight between approximately zero degrees and 10 degrees. The example angles disclosed above may vary depending on a flight condition, the number of passengers in the aircraft, a curvature of a body surface of the aircraft, etc. As a result, a greater percentage of the thrust vector provided by the cabin air exiting the outflow valve may be in a direction opposite a direction of drag, thereby increasing aircraft performance. In other words, the thrust recovery outflow valve may be positioned such that a thrust vector provides a greater percentage of thrust opposite a direction of drag. In addition, the example outflow valves disclosed herein may employ side plates or shields to prevent the exhausted air from exiting the sides of the outflow valve (e.g., from a fluid flow path of the outflow valve) and direct the air generally aft of the outflow valve (e.g., an outlet or throat of the outflow valve). Thus, the increased thrust recovery provided by the example thrust recovery outflow valves disclosed herein can be directly correlated to a decrease in drag and, as a result, reduction in fuel burn and increased aircraft efficiency.

To enable an outlet or throat of the example thrust recovery outflow valve disclosed herein and/or a thrust vector to be aligned or positioned substantially parallel to a direction of flight and/or a body axis of an aircraft to increase (e.g., maximize) thrust recovery, the example thrust recovery outflow valves disclosed herein employ an aerodynamic surface and/or profile. In some examples, the aerodynamic surfaces of the example outflow valves disclosed herein employ a convergent-divergent shape or profile. In some instances (e.g., when a pressure ratio between cabin pressure and atmospheric pressure is greater than approximately 1.89), the convergent-divergent profile provides a supersonic flow exiting the outflow flow valve. In some examples, the thrust recovery outflow valves disclosed herein enable a pressure (e.g., a static pressure) of the cabin air exiting the thrust recovery outflow valve to be substantially similar to (e.g., identical to, substantially identical to, within 10 percent of) the local static pressure of the aircraft external flow. For example, aerodynamic surfaces of the example thrust recovery outflow valves disclosed herein provide an area distribution through the convergent-divergent profile of a fluid flow passageway that allows an outlet pressure of cabin air to substantially match or equal (e.g., be within 10% of) atmospheric pressure at cruise altitudes. In some examples, a divergent profile provided by the aerodynamic surfaces of the example thrust recovery outflow valves disclosed herein may provide an area ratio between an outlet area and a throat area of a fluid flow passageway between approximately 1 and 2. In some examples, the aerodynamic surfaces of the example thrust recovery outflow valves disclosed herein are configured or optimized for cruise conditions (e.g., conditions or pressures at altitudes between approximately 30,000 feet and 40,000 feet).

Additionally, the example thrust recovery valves disclosed herein reduce cabin noise (i.e., maintain noise levels and/or acoustic tones) below sound pressure levels that may be uncomfortable or irritating to passengers without the use of noise suppressors such as, for example, protrusions, vortex generators, etc. For example, the aerodynamic surfaces of the example outflow valves disclosed herein are substantially smooth surfaces (e.g., free from projections, protrusions or vortex generators) and maintain noise or acoustic tones below maximum allowable or acceptable sound pressure levels. However, in some examples, the aerodynamic surfaces of the example outflow valves disclosed herein may include noise suppressors (e.g., protrusions, vortex generators, etc.).

Another example thrust recovery outflow valve includes an actuator coupled to a frame, a first gate mounted to the frame in such a way as to allow rotational movement only, and a second gate similarly mounted to the frame. A surface of the first gate is spaced from a surface of the second gate to define a fluid flow passageway between the aircraft pressure cabin and the outside surface of the aircraft. The two gates move together between a closed position to prevent fluid flow through the fluid flow passageway and a fully open position to allow maximum fluid flow through the fluid flow passageway. A controller communicatively coupled, through an actuator to the gates, moves the gates in such a manner as to allow the desired amount of air flow to escape the cabin at any given moment. The design of the gates then controls the flow and the thrust vector direction of the flow to provide maximum practical thrust recovery in a direction generally opposite the aircraft drag direction.

FIG. 1 illustrates an example aircraft 100 implemented with an example primary outflow valve 102 constructed in accordance with the teachings of this disclosure. The primary outflow valve 102 of the illustrated example is located or positioned adjacent (e.g., near) an aft end 106 of the aircraft 100. The example aircraft 100 of the illustrated example includes, in addition to the primary outflow valve 102, a secondary outflow valve 108 adjacent (e.g., near) a forward end 110 (e.g., a nose) of the aircraft 100.

During a typical mission (e.g., taxiing, take-off, climb, cruise, descent, landing) of the aircraft 100, an environmental control system 112 of the aircraft 100 provides pressurized air to a cabin 114 of a fuselage 116 of the aircraft 100 via, for example, an electric air compressor, bleed air from a turbo-compressor, bleed air provided from one or more compressor stages of a turbine engine 118, and/or any other air source for the environmental control system of the aircraft 100. In turn, a cabin pressurization control system 120 of the aircraft 100 controls or modulates the primary outflow valve 102 and/or the secondary outflow valve 108 to exhaust or vent the cabin air from the cabin 114. In some examples, the cabin pressurization control system 120 may employ the secondary outflow valve 108 only during certain portions of the mission profile (e.g., during taxiing) to control the airflow through the cabin 114.

Additionally, during flight, atmospheric pressure decreases as flight altitude increases. The cabin pressurization control system 120 controls and/or maintains air pressure inside the cabin based on a flight altitude of the aircraft 100. For example, the cabin pressurization control system 120 determines, obtains or otherwise uses a cabin pressure altitude schedule to set or maintain cabin air pressure at a required or desired pressure (e.g., 11 psi during cruise) corresponding to a specific flight altitude of the aircraft 100. Thus, in some examples, the cabin pressurization control system 120 establishes cabin pressure as a function of aircraft pressure altitude. For example, cabin pressure during cruise may be based on an allowable pressure differential between the air pressure in the cabin and the atmospheric pressure at the altitude of the aircraft 100. For example, during cruise, the cabin pressurization control system 120 of the illustrated example may regulate cabin air at a desired pressure between approximately 11 psi and 12 psi (i.e., a cabin altitude of between approximately 8000 feet to 6000 feet) when the aircraft 100 flies at altitudes between 30,000 and 40,000 feet, where the atmospheric air pressure is less than approximately 4.5 psi (e.g., example standard day air pressures at 30,000 and 40,000 feet are 4.36 and 2.72 psi, respectively). In some examples, the maximum cabin altitude cannot exceed 8,000 feet or 10.9 psi. Thus, during cruise, the cabin pressurization control system 120 maintains a cabin pressure to atmospheric pressure ratio that is greater than 1.89 (e.g., a ratio between approximately 2.5 and 4).

In some examples, the cabin pressurization control system 120 may operate or control (e.g., modulate) the primary outflow valve 102 and/or the secondary outflow valve 108 in accordance with a predetermined schedule or as a function of one or more operational criteria. For example, the cabin pressurization control system 120 may include a controller (e.g., a processor) that receives data and/or signals from sensors representative of current flight conditions including, for example, aircraft airspeed, altitude, a number of passengers in the cabin 114, air temperature, atmospheric pressure, cabin pressure, angle of attack, and/or other parameter(s). The data may be provided by aircraft and/or engine control systems and/or may be provided via lookup tables. The cabin pressurization control system 120 may be configured to receive or measure cabin air pressure and atmospheric pressure at the altitude at which the aircraft 100 is flying, and determine (e.g., via a comparator) the pressure differential between the cabin air pressure and atmospheric pressure (e.g., external to the aircraft 100). Based on this pressure differential, the cabin pressurization control system 120 controls the operation of the primary outflow valve 102 and/or the secondary outflow valve 108 to control or modulate the rate (i.e., mass flow rate) at which pressurized air is transferred between the cabin 114 and the atmosphere to control the air pressure within the cabin of the aircraft 100 based on a predetermined pressure differential schedule or criterion.

Additionally, the primary outflow valve 102 and/or the secondary outflow valve 108 may be configured to recover (e.g., maximize) potential energy in the form of pressurized cabin air (e.g., energy expended to condition and/or pressurize the air provided by the environmental control system 112) by directing energy stored in the cabin air released or exhausted from the cabin 114 into the external air stream (e.g., external the aircraft). More specifically, as described in greater detail in connection with FIGS. 2-5, the primary outflow valve 102 and/or the secondary outflow valve 108 of the illustrated example improves (e.g., increases or maximizes) thrust recovery compared to known thrust recovery outflow valves. Increasing outflow valve thrust recovery reduces drag, thereby reducing fuel consumption and improving the performance efficiency of the aircraft 100. In some examples, the aircraft 100 may employ only the primary outflow valve 102. In some examples, the aircraft 100 may employ more than one primary outflow valve 102 and/or more than one secondary outflow valve 108.

Figure 2:
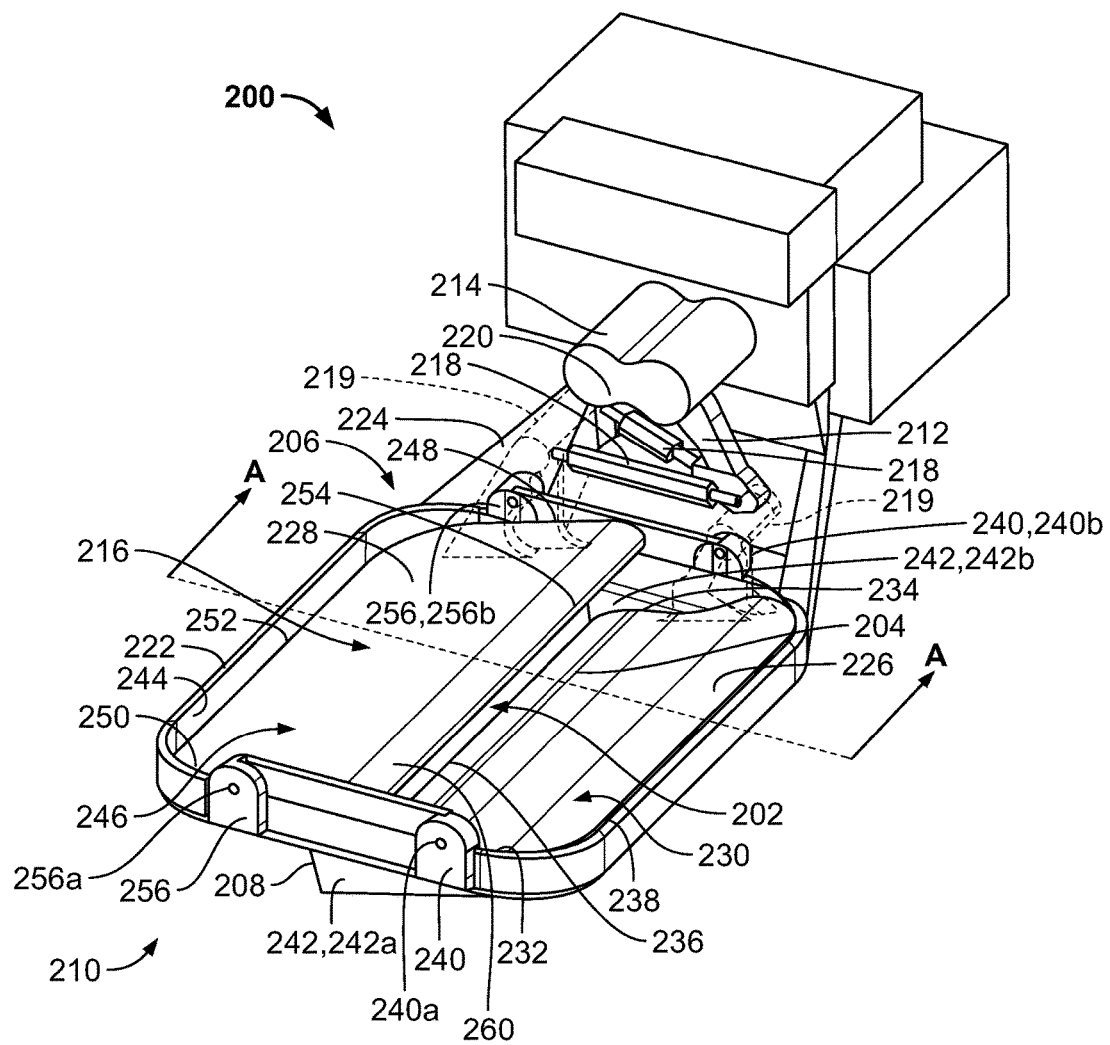
FIG. 2 is a perspective view of an example thrust recovery outflow valve constructed in accordance with the teachings disclosed herein.

FIG. 2 is a perspective view of an example thrust recovery outflow valve 200 in accordance with the teachings of this disclosure. The thrust recovery outflow valve 200 may represent the primary outflow valve 102 and/or the secondary outflow valve 108 of FIG. 1. The thrust recovery outflow valve 200 of the illustrated example defines a passageway 202 (e.g., a fluid flow passageway) having an inlet 204 on an inboard side 206 of the fuselage 116 and an outlet 208 on an outboard side 210 of the fuselage 116. More specifically, the inlet 204 is in fluid communication with the pressurized air in the cabin 114 (FIG. 1) of the aircraft 100 (FIG. 1) and the outlet 208 is in fluid communication with the atmosphere external to the aircraft 100.

The thrust recovery outflow valve 200 of the illustrated example includes an actuation system 212 operatively coupled to the thrust recovery outflow valve 200. The actuation system 212 includes a motor 214, one or more links 208 and/or connectors 219. The motor 214 (e.g., one or more motors, an electric motor, a stepper motor, etc.) is operatively coupled to a flow control member 216 via one or more links or arms 218 and/or connectors 219. In some examples, the arms 218 are coupled to the flow control member 216 via a transmission (e.g., a linkage, a gear transmission, a lever, etc.). The motor 214 is configured to receive commands from the cabin pressurization control system 120 (FIG. 1) to move the flow control member 216 of the thrust recovery outflow valve 200 between a closed position (e.g., a fully closed position) to prevent pressurized cabin air from exhausting to the atmosphere via the outlet 208 and an open position (e.g., a fully open position or a plurality of open positions between the fully open position and the fully closed position) to enable pressurized cabin air to exhaust to the atmosphere. The motor 214 moves or rotates in a first direction relative to a longitudinal axis 220 of the motor 214 to cause the thrust recovery outflow valve 200 to move to the closed position via the arms 218 and rotates in a second direction opposite the first direction to cause the thrust recovery outflow valve 200 to move to the open position (e.g., one or more open positions) via the arms 218.

The thrust recovery outflow valve 200 of the illustrated example includes a frame 222 to allow mounting or coupling of the thrust recovery outflow valve 200 to the aircraft 100. The frame 22 may also couple the flow control member 216 and the motor 214. The frame 222 of the illustrated example has a rectangular shape and is coupled to the actuator 212 via a bracket 224. The flow control member 216 of the illustrated example is pivotally or rotationally coupled to the frame 222. In particular, the flow control member 216 of the illustrated example pivots between the open position to allow fluid flow through the passageway 202 from the inboard side 206 to the outboard side 210 and the closed position to prevent fluid flow through the passageway 202 from the inboard side 206 to the outboard side 210.

The flow control member 216 of the illustrated example includes a first louver or first gate 226 (e.g., a forward gate or flap) and a second louver or second gate 228 (e.g., an aft gate or flap). The first gate 226 includes a first aerodynamic surface 230 between a first side 232, a second side 234, a first end 236 and a second end 238. The first gate 226 is rotationally coupled to the frame 222 at pivot joints 240 (e.g., a first hinge 240a and a second hinge 240b opposite the first hinge 240a) to enable the first end 236 of the first gate 226 to move or pivot relative to the second end 238. Additionally, the frame 222 includes side plates or shields 242 that extend from the frame 222. In particular, a first shield extends 242a from the frame 222 adjacent the first side 232 of the first gate 226 and the second shield 242b extends from the frame 222 adjacent the second side 234 of the first gate 226 opposite the first side 232. In some examples, the shields 242 (e.g., the first and second shields 242a and 242b) extend from the first aerodynamic surface 230 of the first gate 226. The first side 232, the second side 234 and the shields 242 are positioned within and/or move relative to an inner surface or inner perimeter 244 of the frame 222 when the first gate 226 moves between the open position and the closed position.

The second gate 228 of the illustrated example includes a second aerodynamic surface 246 defined by a first side 248, a second side 250, a first end 252 and a second end 254. The second gate 228 of the illustrated example is pivotally or rotationally coupled to the frame 222 at pivot joints 256 (e.g., a first pivot joint 256a and a second pivot joint 256b) to enable the second end 254 of the second gate 228 to pivot or move relative to the first end 252 of the second gate 228. The first side 248 and the second side 250 of the second gate 228 are positioned within the inner surface or perimeter 244 of the frame 222. The second end 254 of the second gate 228 of the illustrated example includes a bellmouth 260. The bellmouth 260 of the illustrated example has a curved geometry (e.g., a bulbous shape or large radius) to condition pressurized airflow through the thrust recovery outflow valve 200 to promote separation free flow and/or increase generation of thrust. In some examples, the second end 254 of the second gate 228 may be implemented without the bellmouth 260. In some examples, the first gate 226 is rotationally coupled to the frame 222 at the second end 238 and the second gate 228 is rotationally coupled to the frame 222 at the first end 252. In other examples, the first gate 226 and/or the second gate 228 may be rotationally coupled to the frame 222 and/or more generally to the fuselage 116 via any other device, fastener and/or technique(s).

In the illustrated example, the first gate 226 and the second gate 228 move relative to each other via the motor 214 and the arms 218 of the actuator 212 between the open position and the closed position to vary the restriction of the passageway 202. In particular, the first end 236 of the first gate 226 moves relative to (e.g., in a direction away from) the second end 254 of the second gate 228 when the thrust recovery outflow valve 200 moves toward the open position, and the first end 236 of the first gate 226 moves relative to (e.g., in a direction toward) the second end 254 of the second gate 228 to move the thrust recovery outflow valve 200 to the closed position. In some examples, the aerodynamic surface 230 of the first gate 226 maintains a substantially parallel relationship (e.g., within a 10 degree difference) relative to the second aerodynamic surface 246 of the second gate 228 when the thrust recovery outflow valve 200 moves between the open and closed positions. In some examples, the first gate 226 moves simultaneously relative to the second gate 228. In some examples, the first gate 226 moves independently relative to the second gate 228. In some examples, a position of the second gate 228 is fixed and the first gate 226 moves relative to the second gate 228.

Figure 3:
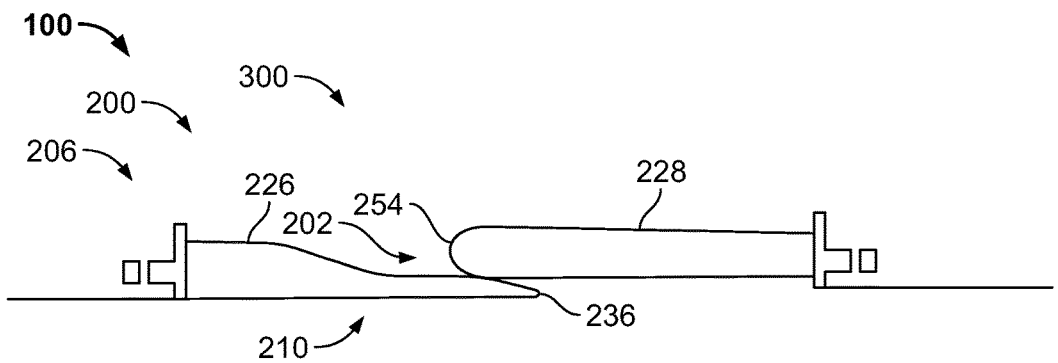
FIG. 3 is a schematic cross-sectional view of the example thrust recovery outflow valve of FIG. 2 shown in a first position.

FIG. 3 is a schematic illustration of the example thrust recovery outflow valve 200 of FIG. 2 taken along line A-A and shown in a closed position 300 (e.g., a fully closed position). The shields 242 (FIG. 2) and the frame 222 (FIG. 2) are not shown in FIG. 3. In operation, the first gate 226 and the second gate 228 move relative to the frame 222 and, more generally, the fuselage 116. In the closed position 300, the first gate 226 (e.g., at least a portion of the first end 236) engages or seals against the second gate 228 (e.g., at least a portion of the second end 254) to restrict or prevent fluid flow through the passageway 202.

Figure 4:
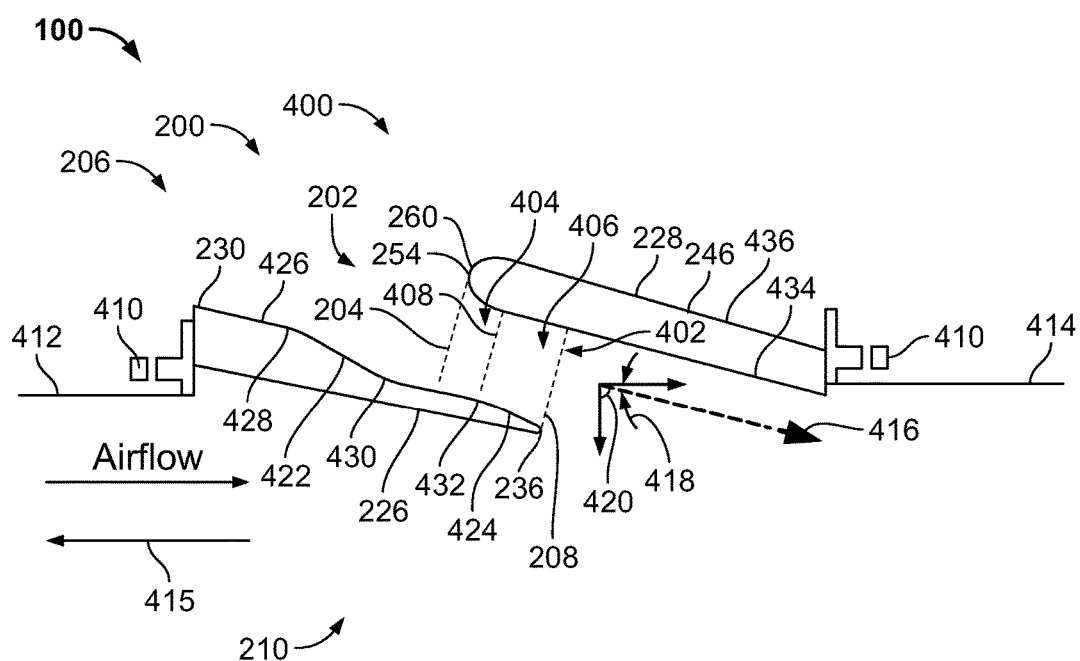
FIG. 4 is a schematic cross-sectional view of the example thrust recovery outflow valve of FIG. 2 shown in a second position.

FIG. 4 is a schematic illustration of the example thrust recovery outflow valve 200 similar to FIG. 3, but shown in an open position 400 (e.g., a partially open, cruise position). When the thrust recovery outflow valve 200 moves to the open position 400, the first gate 226 moves or pivots toward the outboard side 210 and the second gate 228 moves or pivots toward the inboard side 206. In other words, the first end 236 of the first gate 226 moves in a direction away from the second end 254 of the second gate 228. The first gate 226 and second gate 228 vary a cross-sectional flow area (e.g., an effective cross-sectional flow area) of the passageway 202 between the inlet 204 and the outlet 208 of the thrust recovery outflow valve 200. In particular, the first gate 226 may be adjusted relative to the second gate 228 at a plurality of open positions between the closed position 300 of FIG. 3 and a fully open position (e.g., including the partially open position 400 of FIG. 4) to vary (e.g., increase or decrease) mass flow rate that can pass through the passageway 202. In other words, the aerodynamic surface 230 moves relative to the second aerodynamic surface 246 to provide a specific throat area or area distribution through the passageway 202 to allow a specific mass flow rate of the cabin air to exhaust based on a predetermined schedule. For example, the mass flow rate of air required to exhaust from the cabin 114 via the outflow valve 200 may be dependent on the number of passengers and/or flight altitude of the aircraft 100.

In the open position 400, the passageway 202 has a convergent-divergent profile 402 (e.g., a convergent-divergent shape). More specifically, fluid flows along a first portion 404 of the passageway 202 in a converging characteristic (e.g., from a larger cross-sectional area to a smaller cross-sectional area), then flows along a second portion 406 of the passageway 202 in a diverging characteristic (e.g., from a smaller cross-sectional area to a larger cross-sectional area). In particular, the passageway 202 includes the converging profile between the inlet 204 and a throat 408 of the passageway 202, and a diverging profile between the throat 408 and the outlet 208. The first gate 226 moves relative to the second gate 228 to adjust or vary (e.g., increase or decrease) a cross-sectional area of the throat 408 (e.g., based on the required mass flow rate). The throat 408 of the illustrated example provides a smallest cross-sectional area of the passageway 202. In other words, a cross-sectional area at the inlet 204 and a cross-sectional area at the outlet 208 are greater than a cross-sectional area at the throat 408 when the thrust recovery outflow valve 200 moves between the open position 400 and the closed position 300. In some examples, a ratio between an area of the outlet 208 and an area of the throat 408 may be between approximately 1 and 2 during, for example, cruise.

To increase thrust recovery and decrease drag, the thrust recovery outflow valve 200 of the illustrated example is attached to a frame 410 of the aircraft 100 such that the passageway 202 and/or the outlet 208 is positioned adjacent (e.g., aligned close to) a skin or outer surface 412 of the aircraft 100. Additionally, the thrust recovery outflow valve 200 is aligned or positioned (e.g., substantially parallel) relative to the outer surface 412, a body axis 414 (e.g., an outer mold line or a global outer mold line of the aircraft 100) and/or a direction of flight 415. In particular, the outlet 406, the throat 408 and/or more generally the passageway 202 of the thrust recovery outflow valve 200 may be positioned or aligned closer to (e.g., at a smaller angle) or substantially parallel to the outer surface 412, the body axis 414 and/or the direction of flight 415 of the aircraft 100 than known outflow valves of known aircraft. As a result of aligning the throat 408 and/or the outlet 208 substantially parallel to the outer surface 412, the body axis 414 and/or the direction of flight 415, a thrust vector 416 (e.g., a fluid flow direction) of the fluid (e.g., the cabin air) flowing through the throat 408 and/or discharging or exiting the outlet 208 of the thrust recovery outflow valve 200 is positioned closer to parallel (e.g., substantially parallel) to the outer surface 412, the body axis 414 and/or the direction of flight 415 than perpendicular to the outer surface 412, the body axis 414 and/or the direction of flight 415. In other words, the thrust vector 416 has an angle 418 relative to the outer surface 412, the body axis 414 and/or the direction of flight 415 that is smaller than an angle 420 relative to orthogonal. In some examples, an aircraft may fly at a slightly positive angle of attack (e.g., an angle between 0 degrees and 3 degrees between the freestream air flow direction and a longitudinal axis of the fuselage 116). For example, the longitudinal axis of the fuselage 116 may be tilted or canted (e.g., upward) relative to the freestream direction during cruise. As a result, in some instances, the angle 418 of the thrust vector 416 may be approximately zero relative to (e.g., nearly parallel to or between zero degrees and 2 degrees from) the body axis 414 and/or the outer surface 412. In some examples, the angle 418 being substantially parallel includes a range of angles between approximately zero degrees and 10 degrees. In some instances such as during certain cruise operating conditions, the angle 418 being substantially parallel includes a range of angles of approximately between 2.5 degrees and 9 degrees (e.g., 5 degrees). The example angles or range of angles representative of the angle 418 of the thrust recovery vector 416 relative to the outer surface 412, the body axis 414 and/or the direction of flight 415 may vary depending on flight conditions, passenger count in the cabin 114, curvature of a body surface of the aircraft 100, and/or other operating conditions.

As a result of the passageway 202 (e.g., the throat 408 and/or the outlet 208) being positioned at a small angle relative to the outer surface 412, the body axis 414 and/or the direction of flight 415 of the aircraft 100 enables fluid exiting the passageway 202 to provide thrust recovery with a greater percentage of thrust (e.g., a substantially parallel thrust vector) directed opposite to the drag direction. Thus, aircraft performance can be increased because as a greater percentage of the thrust force from the outflow valve exhaust is directed opposite a direction of drag. In contrast, when an outlet and/or a thrust recovery outflow valve is oriented or positioned more perpendicular to the outer surface 412, the body axis 414 and/or the direction of flight 415 than parallel to the outer surface 412, the body axis 414 and/or the direction of flight 415 (e.g., the angle 420 of the thrust vector 416 is smaller than the angle 418), fluid may separate from the outer surface 412 downstream from the thrust recovery outflow valve 200 (e.g., downstream from the outlet 208) and cause a flow pattern (e.g., of the cabin air) downstream from (e.g., the outlet 208 of) the thrust recovery outflow valve 200 to feature unnecessary turbulence. As a result, less force may be directed in the direction of flight 415 and/or may increase drag, resulting in decreased thrust recovery. Thus, positioning the outlet 208 of the thrust recovery outflow valve 200 in an orientation that is closer to parallel (e.g., the thrust vector 416 of the discharging cabin air having the angle 418 smaller than the angle 420) to the outer surface 412, the body axis 414 and/or the direction of flight 415 significantly reduces or decreases occurrence of separated flow as the cabin air is discharged from the outlet 208 at a relatively high velocity, thereby decreasing drag and increasing fuel efficiency.

To enable positioning the thrust recovery outflow valve 200 (e.g., the throat 408 and/or the outlet 406) more parallel to the outer surface 412, the body axis 414 and/or the direction of flight 415 while having the convergent-divergent profile 402, the first aerodynamic surface 230 of the first gate 226 includes a first portion 422 having a first profile and a second portion 424 having a second profile different from the first profile. The first portion 422 of the illustrated example has a curved surface and the second portion 424 has an angled or tapered profile or shape (e.g., a slanted surface). More specifically, the first portion 422 is positioned between the second portion 424 and a third portion 426 of the first aerodynamic surface 230. The first portion 422 of the illustrated example provides a transition between the second portion 424 and the third portion 426. The second portion 424 of the illustrated example is offset or recessed (e.g., is positioned lower in the orientation of FIG. 4) relative to the third portion 426. The first portion 422 has an arcuate or curved profile (e.g., has a concave curved shape) that transitions between the third portion 426 and the second portion 424.

More specifically, the curved profile of the first portion 422 commences at a first end 428 of the third portion 426 and extends downward from the third portion 426 in the orientation of FIG. 4 to define a valley 430 of the first portion 422. The first portion 422 slopes upwardly from the valley 430 in the orientation of FIG. 4 and terminates at a first end 432 of the second portion 424. The valley 430 and/or the upward slope of the first portion 422 and at least a portion of the bellmouth 260 of the second gate 228 (e.g., upstream from the throat 408) define the converging characteristic 404 of the passageway 202. The second portion 424 of the illustrated example angles downwardly between the first end 432 of the second portion 424 and the outlet 208. The second portion 424 of the first aerodynamic surface 230 of the first gate 226 and a first portion 434 of the second aerodynamic surface 246 of the second gate 228 (e.g., downstream from the throat 408) provide or define the diverging characteristic 406 of the passageway 202.

Additionally, the first aerodynamic surface 230 of the first gate 226 is substantially smooth and/or free of noise suppressors (e.g., protrusions or projections, vortex generators, etc.) projecting from (e.g., perpendicular to, or extending upward from) the first aerodynamic surface 230. However, in some examples, the first aerodynamic surface 230 may employ noise suppressors (e.g., projections or protrusions, vortex generators) to reduce noise. Further, the second aerodynamic surface 246 (e.g., the first portion 434 and a second portion 436) of the second gate 228 of the illustrated is substantially smooth and free of protrusions or projections (e.g. vortex generators) projecting (e.g., perpendicular to, or downward) from the second aerodynamic surface 246. However, in some examples, the second aerodynamic surface 246 may employ noise suppression apparatus (e.g., protrusions) to reduce noise generation. The bellmouth 260 (e.g., the bulbous or large radius end) has a relatively large radius to provide a smooth transition between the first portion 434 of the first aerodynamic surface 422 of the second gate 228 and a second portion 436 of the second aerodynamic surface 246 of the second gate 228 opposite the first portion 434. The bellmouth 260 of the second gate 228 reduces flow separation along the second gate 228 to reduce or restrict a level of noise of the thrust recovery outflow valve 200. The bellmouth 260 reduces flow separation or detachment from the first portion 436 of the second aerodynamic surface 246 and/or the second portion 436 of the second aerodynamic surface 246 as the fluid from the cabin 114 flows across the second gate 228 and toward the outlet 208.

During normal operating conditions, the thrust recovery outflow valve 200 is typically in a fully open position (e.g., the first gate 226 and the second gate 228 are spaced apart at a maximum distance) when the aircraft 100 is taxiing (e.g., on the ground prior to take-off) because air pressure in the cabin 114 (FIG. 1) does not need regulation based on a pressure differential between the atmospheric pressure (e.g., at sea level) and the cabin pressure. During takeoff, the first gate 226 and the second gate 228 move gradually towards the closed position 300 (FIG. 3) and the open position 400 to control (e.g., minimize) rate of change of pressure in the cabin 114. During cruise conditions, the thrust recovery outflow valve 200 modulates (e.g., the first gate 226 and the second gate 228 move between the closed position 300 and the open position 400) to adjust an area of the throat 408 or effective flow cross-sectional area of the passageway 202 to regulate the air pressure within the cabin 114 in accordance with a predetermined cabin pressure control schedule. For example, in some instances, the mass flow rate may be determined based on the number of passengers in the cabin 114. For example, a mass flow rate through the passageway 202 of the thrust recovery outflow valve 200 may be between approximately 2.0 (pounds/second) and 8.0 (pounds/second) when the aircraft 100 is traveling at Mach 0.84 at an altitude of approximately 37,000 feet, with a cabin pressure of 11.78 psi and a cabin temperature of 72° F.

At cruise, the cabin pressure ratio (e.g., cabin pressure to atmospheric pressure ratio) is at least greater than 1.89 (e.g., between approximately 3.0 and 5.0). As a result, the thrust recovery outflow valve 200 operates as a supersonic nozzle. In other words, a pressure ratio between cabin pressure and ambient pressure that is greater than approximately 1.89 provides a flow velocity of Mach 1 at the throat 408 (e.g., the minimum or smallest area) of the convergent-divergent profile 402. Thus, the throat 408 provides a chocked flow (e.g., a fluid flow velocity of Mach 1) when the pressure differential between the cabin pressure and the ambient pressure is greater than 1.89. In particular, during choked flow, the mass flow rate does not increase or decrease due to changing ambient pressure, but remains constant, for a constant throat geometry. Thus, an area ratio between the area of the throat 408 and the area of the outlet 208 can be used to determine the pressure of the fluid exiting or exhausting from the outlet 208 (e.g., exit pressure) and the velocity of the fluid exiting the outlet 208 (e.g., exit velocity).

During cruise operation, the cabin pressurization control system 120 (FIG. 1) determines a specific throat area 408 needed to exhaust a specified mass flow rate of cabin air to the atmosphere in order to maintain a predetermined cabin air pressure (e.g., based on a predetermined schedule). The cabin pressurization control system 120 (FIG. 1) positions the first gate 226 relative to the second gate 228 such that the first aerodynamic surface 230 and the second aerodynamic surface 246 provide a throat area of the throat 408 sufficient to accommodate the mass flow rate of the cabin air to the outlet 208 needed to maintain a predetermined cabin air pressure. Thus, the position of the first gate 226 and the second gate 228 vary an area of the throat 408.

Additionally, a profile of the first aerodynamic surface 230 and/or the second aerodynamic surface 246 may be configured (e.g., shaped) to provide a target or specific outlet-to-throat area ratio (e.g., a ratio between an area of the outlet 208 and an area of the throat 408) based on predetermined operating condition or parameter ranges that the aircraft 100 may experience during a mission profile (e.g., during cruise). In this manner, the profile of the first aerodynamic surface 230 and the profile of the second aerodynamic surface 246 are configured to provide a cross-sectional area ratio that may be optimized for cruise conditions. Thus, because the profiles or shapes of the first aerodynamic surface 230 and the second aerodynamic surface 246 are fixed, a specific area of the throat 408 correlates or corresponds to a specific area of the outlet 208. In this manner, for a given range of throat areas needed to transfer a specified mass flow rate of air from the cabin to atmosphere during cruise conditions, the profiles of the first and second aerodynamic surfaces 230 and 246 may be configured (e.g. predetermined) to provide specific areas of the outlet 208 corresponding to the specific areas at the various positions of the throat 408.

Thus, an area of the throat 408 provided by the position of the first gate 226 relative to the position of the second gate 228 may result in an area at the outlet 208 that causes an exit pressure of the cabin air at the outlet 208 to be substantially similar to (e.g., to match or be within plus or minus 10 percent of) the ambient or atmospheric pressure at a given cruise altitude. In particular, substantially matching the exhaust air pressure and the ambient cruise pressure at the outlet 208 of the thrust recovery outflow valve 200 is achieved via the convergent-divergent profile 402. The convergent-divergent profile 402 provided by the first gate 226 (e.g., the first aerodynamic profile 230) and the second gate 228 (e.g., the second aerodynamic profile 246) enables the air pressure in the cabin 114 (and/or at the inlet 204) to decrease between the throat 408 and the outlet 208, while increasing the velocity of the air to supersonic speeds at the outlet 208.

For example, an optimal throat area to outlet area ratio may be determined by a cabin pressure ratio during cruise. The cabin pressure ratio may be based on a pressure ratio between atmospheric pressure at a given cruise altitude and a measured pressure inside the cabin and/or at the inlet 204. In the example aircraft 100 of FIG. 1, the cabin pressurization control system 120 determines the cabin pressure ratio (e.g., atmospheric pressure to cabin pressure ratio). For example, to determine the cabin pressure ratio, the cabin pressurization control system 120 may receive (e.g., via a sensor or data from a control system) a pressure value of the atmospheric pressure at a given altitude and a pressure of the air in the cabin 114 and/or the pressure of the fluid at the inlet 204. Based on this determined cabin pressure ratio, the cabin pressurization control system 120 determines an area of the throat 408 required to accommodate a specific mass flow rate of the cabin air to the atmosphere. The cabin pressurization control system 120, for example, can determine the throat area from a look-up table, system memory and/or may calculate the ratio based on other received data or information (e.g., from a FADEC, sensor, etc.). Based on the determined throat area, the cabin pressurization control system 120 commands the motor 214 (FIG. 2) to move in either the first direction or the second direction to control or move the first gate 226 relative to the second gate 228 to provide the determined throat area at the throat 408. At a specific throat area, the first and second gates 226 and 228 provide an outlet area that causes the cabin air to exit at substantially the same pressure as atmospheric pressure associated with the altitude of the aircraft 100. As noted above, such exit area is provided by the first and second aerodynamic surfaces 230 and 246 that may be optimized for conditions and/or parameters that the aircraft 100 experiences during cruise. As a result, an outlet area to throat area ratio (e.g., between approximately 1 and 2) may be achieved to provide an exit pressure of the cabin air at the outlet 208 that is substantially similar to the atmospheric pressure experienced during cruise (e.g., an altitude of the aircraft 100 between 30,000 feet and 40,000 feet) for a range of throat areas that may be needed to accommodate mass flow rates of the cabin air during cruise.

Figure 5:
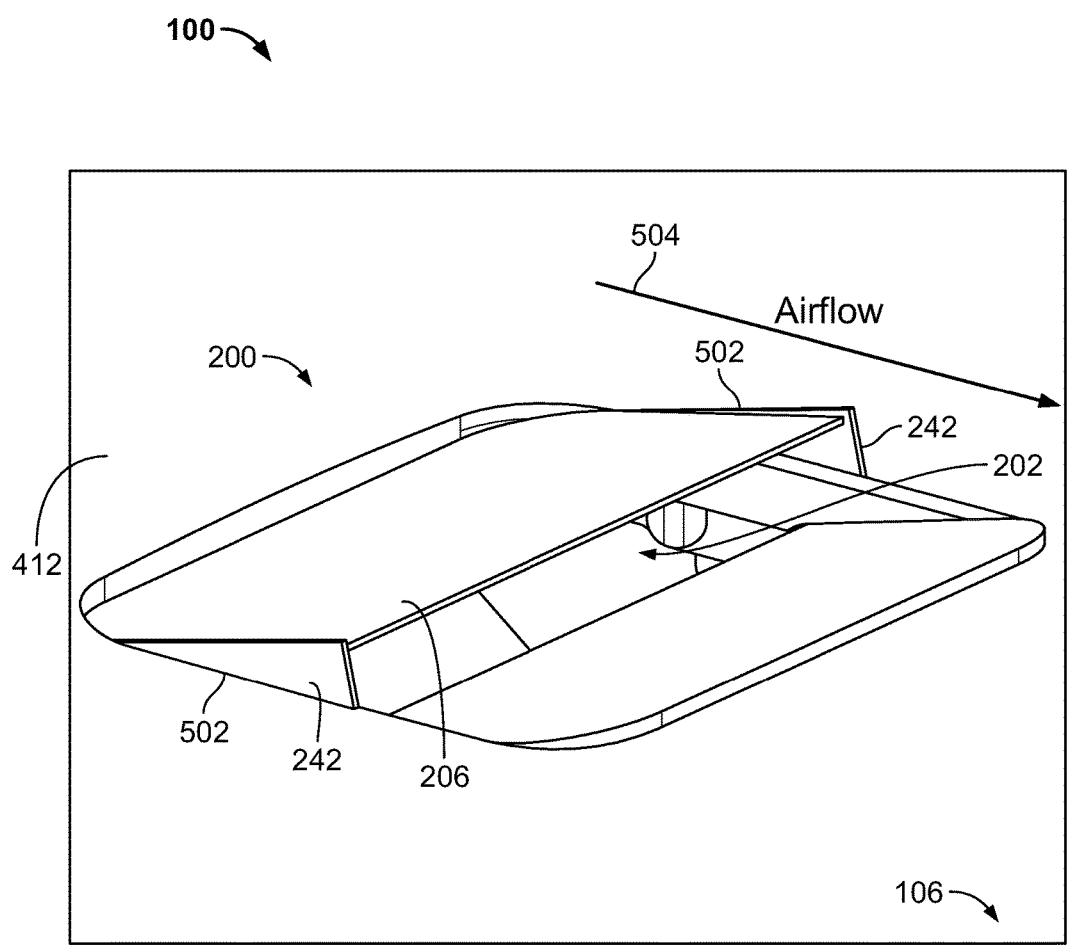
FIG. 5 illustrates a partial, enlarged view of the example thrust recovery outflow valve mounted to an aircraft.

FIG. 5 illustrates a partial, enlarged view of the thrust recovery outflow valve 200 of FIGS. 2-4 coupled to the aircraft 100. As illustrated in FIG. 5, unlike some known outflow valves that have outlet openings oriented more in the outward direction (e.g., at a 45 degree angle relative to the outer surface 412, more toward perpendicular to the outer surface 412), the outlet 208 is positioned or oriented (e.g., angled) toward the aft end 106 of the aircraft 100. To further guide the exhaust air toward the aft end 106 of the aircraft 100, the shields 242 extend from the first gate 226 to prevent the air in the passageway 202 from exiting via sides 502 of the thrust recovery outflow valve 200 (e.g., a direction perpendicular relative to a direction of airflow 504) prior to the cabin air exiting the outlet 208. The shields 242 extend from the frame 222 to direct the cabin air exiting the outlet 208 toward the aft end 106 of the aircraft 100. As shown herein, the passageway 202 (e.g., the shields 242, the first gate 226 and the second gate 228) provides a rectangular cross-section or shape. However, in other examples, the passageway 202 may have any other shape or profile (e.g., square, circular, etc.). Further, the first gate 226 projects from the outer surface 412 of the aircraft 100 and extends into a slipstream so as to form a shield to prevent ram air from interfering with the discharging cabin air at the outlet 208 during flight (e.g., take-off, cruise, ascent, decent, etc.).

At least some of the aforementioned examples include one or more features and/or benefits including, but not limited to, the following:

In some examples, a thrust recovery outflow valve includes a flow control member having a first aerodynamic surface and a second aerodynamic surface to define at least a portion of a fluid flow passageway between an inlet and an outlet of the thrust recovery outflow valve. In some examples, a first portion of the first aerodynamic surface and a first portion of the second aerodynamic surface provide a converging profile between the inlet and a throat of the fluid flow passageway. In some examples, a second portion of the first aerodynamic surface and a second portion of the second aerodynamic surface provide a diverging profile between the throat and the outlet of the fluid flow passageway. In some examples, the fluid flow passageway is positioned at a small angle relative to an outer surface of an aircraft to enable fluid exiting the fluid flow passageway to provide a thrust recovery vector oriented substantially parallel to the outer surface of the aircraft and opposite a direction of drag.

In some examples, the thrust recovery vector has an angle of between approximately zero degrees and ten degrees relative to the outer surface of the aircraft (e.g., when the thrust recovery vector is substantially parallel relative to the outer surface).

In some examples, the flow control member includes shields extending from respective sides of the flow control member, the shields to define a portion of the fluid flow passageway.

In some examples, the flow control member includes a first gate movable relative to a second gate, the first gate defining the first aerodynamic surface and the second gate defining the second aerodynamic surface.

In some examples, the shields extend from the first gate.

In some examples, a controller is communicatively coupled to the thrust recovery outflow valve. In some examples, the controller to determine a cabin to atmosphere pressure differential or pressure ratio between a cabin pressure of an aircraft and atmospheric pressure at a given altitude of the aircraft.

In some examples, the controller is to determine a throat area of the fluid flow passageway to accommodate a mass flow rate of cabin air between a cabin of the aircraft and the atmosphere needed to maintain the cabin pressure at a predetermined value. In some examples, the throat area results in an outlet area that enables an exit pressure of the cabin air exiting the outlet to be substantially similar to the pressure of atmosphere at the given altitude.

In some examples, a thrust recovery outflow valve for use with an aircraft includes a first gate having a first aerodynamic surface and a second gate having a second aerodynamic surface. In some examples, the first gate moves relative to the second gate between an open position to allow fluid flow to atmosphere and a closed position to prevent fluid flow to atmosphere. In some examples, the first aerodynamic surface of the first gate is spaced from the second aerodynamic surface of the second gate to define a fluid flow passageway having a convergent-divergent shape or profile when the thrust recovery outflow valve is in the open position. In some examples, the first aerodynamic surface has a first portion and a second position, the second portion positioned between the first portion and an outlet of the thrust recovery outflow valve. In some examples, the first portion includes a curved profile and an upwardly extending surface extending from an end of the curved profile. In some examples, the second portion has a tapered profile extending between a first end adjacent the first portion and a second end adjacent the outlet.

In some examples, the first aerodynamic surface and the second aerodynamic surface enable a thrust recovery vector exiting the outlet to be substantially parallel relative to the body axis of the aircraft.

In some examples, the thrust recovery vector has an angle of between approximately 0 degrees and 10 degrees relative to the body axis of the aircraft when the thrust recovery vector is substantially parallel relative to the body axis.

In some examples, the first gate includes side plates extending from the first aerodynamic surface, the side plates to direct the fluid in the fluid flow passageway toward an outlet of the thrust recovery outflow valve.

In some examples, the first aerodynamic surface and the second aerodynamic surface are substantially free of projections into the thrust recover flow stream from (e.g., protrusions extending non-parallel to) the respective first and second aerodynamic surfaces.

In some examples, the fluid flow passageway defines an inlet, a throat and an outlet.

In some examples, at least one of the throat or the outlet is to be oriented closer to parallel relative to a body axis of the aircraft than orthogonal relative to the body axis.

In some examples, a first portion of the fluid flow passageway between the inlet and the throat has a converging profile.

In some examples, a second portion of the fluid flow passageway between the throat and the outlet has a diverging profile.

In some examples, a cross-sectional area at the throat is adjustable by moving the first gate relative to the second gate.

In some examples, a thrust recovery outflow valve for use with an aircraft includes an actuator coupled to a frame. In some examples, a first gate is rotationally coupled to the frame. In some examples, a second gate is rotationally coupled to the frame. In some examples, a surface of the first gate to be spaced from a surface of the second gate to define a fluid flow passageway between an inlet and an outlet of the thrust recovery outflow valve. In some examples, the first gate is to move relative to the second gate between a closed position to prevent fluid flow through the fluid flow passageway and an open position to allow fluid flow through the fluid flow passageway. In some examples, a controller communicatively coupled to the actuator. In some examples, the controller is to determine a position of the first gate relative to the second gate that provides a throat area of the fluid flow passageway to accommodate a predetermined mass flow rate of cabin air. In some examples, the position of the first gate and the second gate results in an outlet area to throat area ratio through at least a portion of the fluid flow passageway that enables cabin air exiting the outlet of the fluid flow passageway to be substantially similar to atmospheric pressure at an altitude at of the aircraft.

In some examples, the first surface of the first gate and the second surface of the second gate are substantially parallel when the first gate moves relative to the second gate.

In some examples, the first surface of the first gate and the second surface of the second gate define the fluid flow passageway having a convergent-divergent profile.

In some examples, a first portion of the fluid flow passageway between the inlet and the throat provides a converging profile and a second portion of the fluid flow passageway between the throat and the outlet provides a diverging profile.

In some examples, a thrust vector of the fluid exiting the outlet of the thrust recovery outflow valve is closer to parallel relative to an outer mold line of the aircraft than orthogonal relative to the outer mold line.

In some examples, the outlet of the fluid flow passageway is positioned at a small angle relative to an outer surface of the aircraft to enable fluid exiting the fluid flow passageway to provide a thrust recovery thrust vector substantially aligned with at least one of an outer mold line of the aircraft or a direction of flight and opposite a direction of drag.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A thrust recovery outflow valve comprising:
a flow control member having a first aerodynamic surface and a second aerodynamic surface to define at least a portion of a fluid flow passageway between an inlet and an outlet of the thrust recovery outflow valve, a first portion of the first aerodynamic surface and a first portion of the second aerodynamic surface to provide a converging profile between the inlet and a throat of the fluid flow passageway, and a second portion of the first aerodynamic surface and a second portion of the second aerodynamic surface to provide a diverging profile between the throat and the outlet of the fluid flow passageway, the flow control member to couple to an outer surface of a fuselage of an aircraft, the fluid flow passageway being positioned at a small angle relative to the outer surface of an aircraft when the valve is in an open position to enable fluid exiting the fluid flow passageway to provide a thrust recovery vector oriented substantially parallel to the outer surface of the aircraft and opposite a direction of drag; and
a controller communicatively coupled to the thrust recovery outflow valve, the controller to determine a ratio between a cabin pressure of the aircraft and an atmospheric pressure at a given altitude of the aircraft, the controller to determine a throat area of the fluid flow passageway to accommodate a mass flow rate of cabin air between a cabin of the aircraft and an atmosphere needed to maintain the cabin pressure at a predetermined value and provide an outlet area to enable an exit pressure of cabin air exiting the outlet to be substantially equal to the atmospheric pressure at the given altitude.

2. The valve of claim 1, wherein the thrust recovery vector has an angle of between approximately zero degrees and ten degrees relative to the outer surface of the aircraft.

3. The valve of claim 1, wherein the flow control member includes shields extending from respective sides of the flow control member, the shields to define a portion of the fluid flow passageway.

4. The valve of claim 3, wherein the flow control member includes a first gate movable relative to a second gate, the first gate defining the first aerodynamic surface and the second gate defining the second aerodynamic surface.

5. The valve of claim 4, wherein the shields extend from the first gate.

6. The valve of claim 1, wherein a thrust recovery vector has an angle of between approximately 0 degrees and 10 degrees relative to a body axis of the aircraft when the thrust recovery vector is substantially parallel relative to the body axis.

7. A thrust recovery outflow valve for use with an aircraft:
a first gate having a first aerodynamic surface; and
a second gate having a second aerodynamic surface, the first gate to move relative to the second gate between an open position to allow fluid flow to atmosphere and a closed position to prevent fluid flow to atmosphere, the first aerodynamic surface of the first gate being spaced from the second aerodynamic surface of the second gate to define a fluid flow passageway having a convergent-divergent shape or profile when the thrust recovery outflow valve is in the open position, the first aerodynamic surface having a first portion and a second position, the second portion positioned between the first portion and an outlet of the thrust recovery outflow valve, the first portion including a curved profile and an upwardly extending surface extending from an end of the curved profile, the second portion having a tapered profile extending between a first end adjacent the first portion and a second end adjacent the outlet; and
a controller to determine a ratio between a cabin pressure of the aircraft and an atmospheric pressure at a given altitude of the aircraft, the controller to move the first gate and the second gate to provide an outlet area to enable an exit pressure of cabin air exiting the outlet area to be substantially equal to the atmospheric pressure at the given altitude.

8. The valve of claim 7, wherein the first gate includes side plates extending from the first aerodynamic surface, the side plates to direct the fluid in the fluid flow passageway toward an outlet of the thrust recovery outflow valve.

9. The valve of claim 7, wherein the first aerodynamic surface and the second aerodynamic surface are substantially free of projections into a thrust recovery flow stream from the respective first and second aerodynamic surfaces.

10. The valve of claim 7, wherein the fluid flow passageway includes an inlet, a throat and an outlet, at least one of the throat or the outlet defining the outlet area.

11. The valve of claim 10, wherein at least one of the throat or the outlet is to be oriented closer to parallel relative to the body axis of the aircraft than orthogonal relative to the body axis when the valve is in the open position.

12. The valve of claim 10, wherein a first portion of the fluid flow passageway between the inlet and the throat has a converging profile.

13. The valve of claim 12, wherein a second portion of the fluid flow passageway between the throat and the outlet has a diverging profile.

14. The valve of claim 10, wherein a cross-sectional area at the throat is adjustable by moving the first gate relative to the second gate.

15. A thrust recovery outflow valve for use with an aircraft, the thrust recovery outflow valve comprising:
an actuator coupled to a frame;
a first gate rotationally coupled to the frame;
a second gate rotationally coupled to the frame, a surface of the first gate to be spaced from a surface of the second gate to define a fluid flow passageway between an inlet and an outlet of the thrust recovery outflow valve, the first gate to move relative to the second gate between a closed position to prevent fluid flow through the fluid flow passageway and an open position to allow fluid flow through the fluid flow passageway; and
a controller communicatively coupled to the actuator, the controller to determine a position of the first gate relative to the second gate that provides a throat area of the fluid flow passageway to accommodate a predetermined mass flow rate of cabin air, wherein the position of the first gate and the second gate is to provide an outlet area to throat area ratio through at least a portion of the fluid flow passageway that enables cabin air exiting the outlet of the fluid flow passageway to be substantially similar to atmospheric pressure associated with an altitude of the aircraft.

16. The valve of claim 15, wherein the first surface of the first gate and the second surface of the second gate are substantially parallel when the first gate moves relative to the second gate.

17. The valve of claim 15, wherein the first surface of the first gate and the second surface of the second gate define the fluid flow passageway having a convergent-divergent profile.

18. The valve of claim 15, wherein a first portion of the fluid flow passageway between the inlet and the throat provides a converging profile and a second portion of the fluid flow passageway between the throat and the outlet provides a diverging profile.

19. The valve of claim 15, wherein a thrust vector of the fluid exiting the outlet of the thrust recovery outflow valve is closer to parallel relative to an outer mold line of the aircraft than orthogonal relative to the outer mold line.

20. The valve of claim 15, wherein the outlet of the fluid flow passageway is positioned at a small angle relative to an outer surface of the aircraft when the fluid flow passageway is in an open position to enable fluid exiting the fluid flow passageway to provide a thrust recovery thrust vector substantially aligned with at least one of an outer mold line of the aircraft or a direction of flight and opposite a direction of drag.

\* \* \* \* \*